Figure 1:
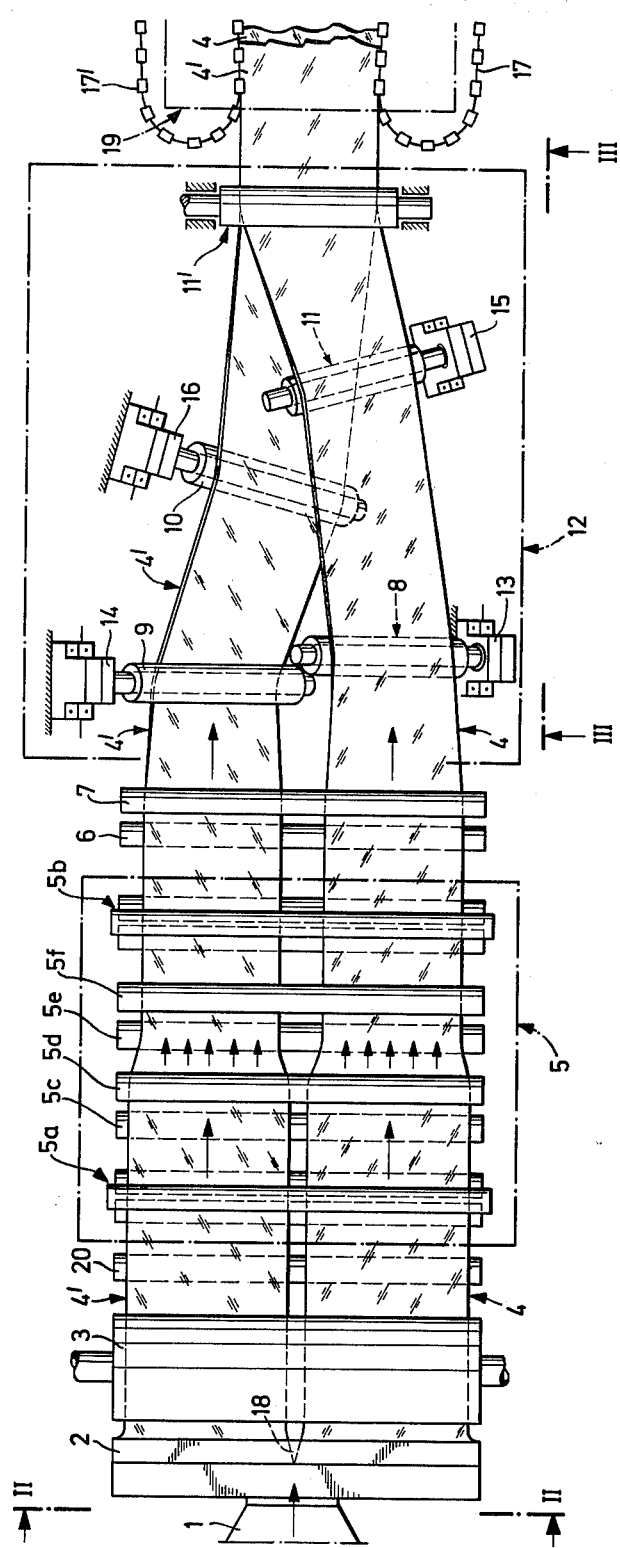

United States Patent [19]

Schmidt

[11] 4,076,785

[45] Feb. 28, 1978

[54] METHOD OF AND APPARATUS FOR INCREASING THE PRODUCTION OUTPUT OF STRETCHED FLAT FILM WEBS COMPOSED OF THERMOPLASTIC MATERIAL

[75] Inventor: Willi Johann Schmidt, Taunusstein, Germany

[73] Assignee: Hoechst Aktiengesellschaft, Germany

[21] Appl. No.: 590,501

[22] Filed: Jun. 26, 1975

[30] Foreign Application Priority Data

Jun. 29, 1974   Germany ............................ 2431385

[51] Int. Cl.$^2$ ............................................. B29D 7/24
[52] U.S. Cl. ................................... 264/146; 264/157; 264/160; 264/210 R; 264/288; 264/289; 264/DIG. 73
[58] Field of Search ................... 264/210 R, 146, 147, 264/145, 288, 289 R, 291, DIG. 73; 156/244

[56] References Cited

U.S. PATENT DOCUMENTS

| 2,618,012 | 11/1952 | Milne | 264/DIG. 73 |
| 2,704,860 | 3/1955 | Russell | 264/146 |
| 2,852,813 | 9/1958 | Longstreth | 264/210 R |
| 3,416,986 | 12/1968 | Carley | 264/146 |
| 3,419,650 | 12/1968 | Ryan | 264/146 |
| 3,516,886 | 6/1970 | Quackenbush et al. | 264/210 R |
| 3,527,859 | 9/1970 | Fairbanks | 264/146 |

FOREIGN PATENT DOCUMENTS 1,704,764   2/1971   Germany .......................... 264/288

Primary Examiner—Jeffery R. Thurlow
Attorney, Agent, or Firm—James E. Bryan

[57] ABSTRACT

This invention relates to an improvement in a method for increasing the production of stretched flat film webs of thermoplastic material in which a melt of thermoplastic material is extruded from a slot die, the melt is solidified to form a film, the film is transversely stretched, the stretched film is heat-set, divided into narrower webs, and wound up, the improvement comprising extruding the melt from a slot die wider than the die normally employed for the production of a preliminary film, which usually corresponds to the width of a transverse stretching frame, dividing the melt in the longitudinal direction into at least two films, superposing the film webs, and transversely stretching said superposed webs. The invention also relates to an apparatus for performing the method.

3 Claims, 4 Drawing Figures

U.S. Patent  Feb. 28, 1978  Sheet 1 of 4  4,076,785

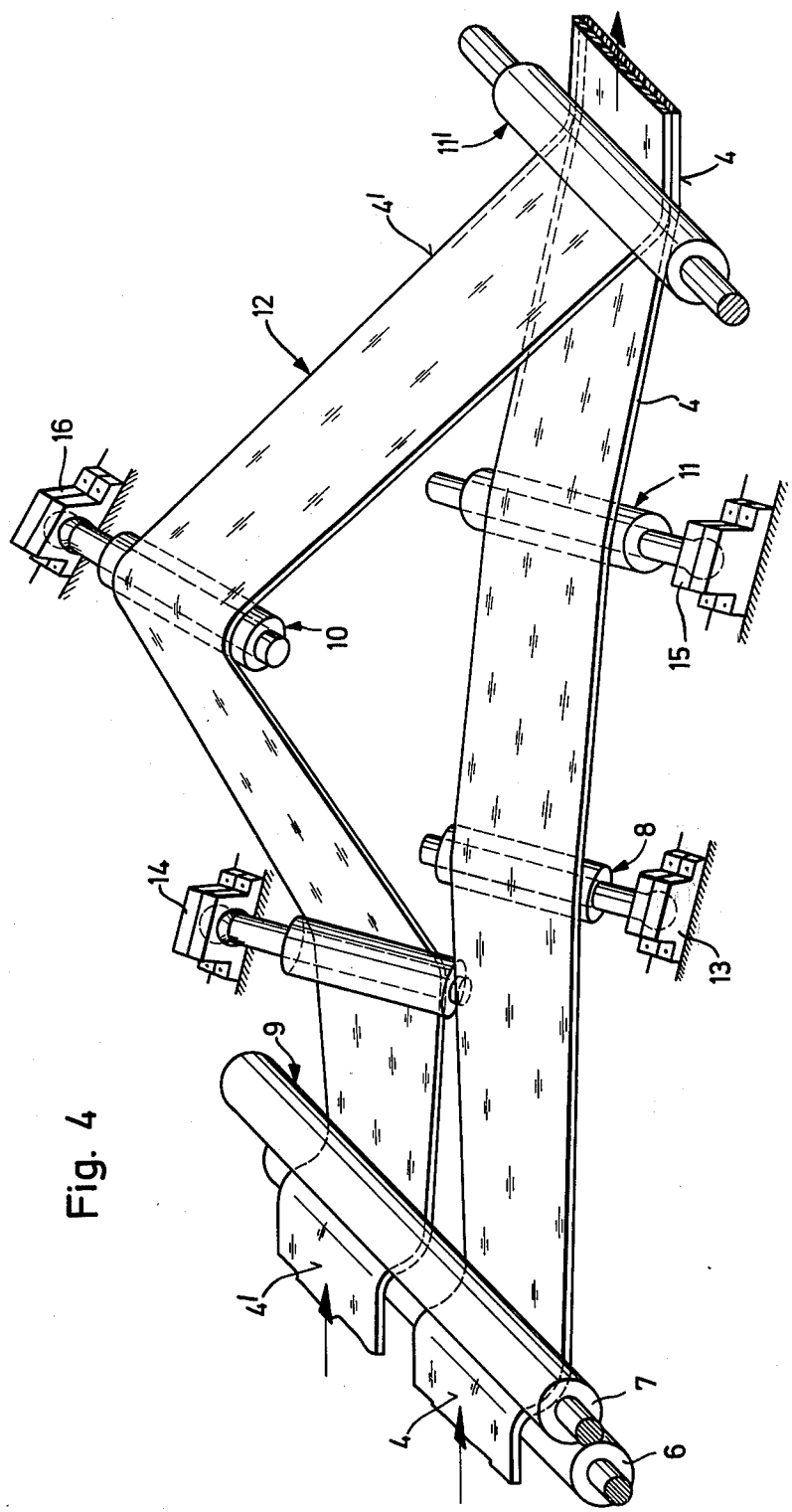

METHOD OF AND APPARATUS FOR INCREASING THE PRODUCTION OUTPUT OF STRETCHED FLAT FILM WEBS COMPOSED OF THERMOPLASTIC MATERIAL

The present invention relates to a method for the production of at least transversely stretched flat film webs composed of thermoplastic material, in particular of polyesters or polypropylene, and to an apparatus suitable for carrying out the method.

Methods and apparatuses for stretching flat plastic films in at least one direction have formed part of the prior art for a long time. Thus, numerous methods for longitudinal or transverse stretching are known, as well as methods for longitudinal-transverse stretching and transverse-longitudinal stretching and methods for simultaneous stretching.

In the stenter methods, the melt is pressed through a slot die, solidified on a cooling drum to form a preliminary film, then longitudinally and/or transversely stretched, as desired, and then heat-set, if desired, before the flat film web is wound up.

The stretching process is limited by the width of the transverse stretching frame, which usually is about 5 meters, and by the maximum operating speed of the machine, which usually is about 200 m/min, which also limits the production output.

The limits are generally due to constructional measurements. In order to guarantee the necessary retention time of the films in the stretching areas, and during heat-setting, the traveling speeds would have to be increased and the constructional measurements extended to an intolerable degree.

From German Pat. No. 1,704,764, a process for the production of stretched film webs of thermoplastic material is known, in which process several superposed film webs are stretched and, by means of pressing and-/or heating before stretching, the adherence of the different film webs to each other is adjusted in such a manner that on the one hand the film webs adhere immovably to each other during the stretching process, but on the other hand they can be separated after the stretching. The object of this patent is a stretching process which makes it possible to stretch even those film webs the flexibility of which does not permit, or permits only under unfavorable conditions, a stretching process carried out in known manner.

Even if multi-layer composite films are stretched, the above-mentioned process serves in no way to increase production output of at least transversely stretched plastic films.

It is the object of the present invention to considerably increase the production output of at least transversely stretched flat film webs of thermoplastic material.

This object is achieved by an improved method in which the melt of thermoplastic material is extruded from a slot die, the melt is solidified to form a film, the film is transversely stretched, the stretched film web is subjected to heat-setting and is divided into narrower webs and then wound up. The improvement is that the melt is extruded from a slot die which is wider than the die normally used for the production of the preliminary film, usually corresponding to the width of the chosen transverse stretching frame and for the subsequent transverse stretching, the melt is preferably divided in the longitudinal direction into at least two films, the solidified film webs are, before the transverse stretching takes place, superposed and the superposed film webs are together transversely stretched.

The considerable advantages of the method according to the invention are apparent, because the usual stretching frames may be used without changing their construction, and the film output is at least twice as great. The die necessary for this need not be more than twice as wide and should have the corresponding extruding device and a device for superposing the film webs before the transverse stretching takes place.

However, the invention is not limited to the simultaneous stretching of two film webs, but is also useful for simultaneously stretching more than two film webs, in which case a slot die having the corresponding width and several points for longitudinal division as well as a corresponding number of devices for superposing the films must be provided. The number of webs is limited only by the width of producible slot dies and by the thickness of the films to be transversely stretched, which should all be subjected to the same conditions in the stretching frame.

In the production of thin films in the range from about 2 to 12μ, several film webs may be stretched simultaneously whereas in the case of thicker film webs up to a thickness of about 100μ, stretching is preferably carried out with only two film layers.

Even if the longitudinal division basically also can be carried out when the preliminary film is cooled off, e.g. by means of knives, practice has shown that it is particularly favorable and safe to divide the melt. It has proved to be particularly favorable to divide the melt in the die lip, which is preferably done by dividing wedges.

Of course it must be taken into account in this method that each of the divided preliminary films must correspond, as far as its volume goes, to the quantity of material which is necessary for one finished film, after the separation of the two layers. This means that the extruder output must be increased, for example doubled.

The method according to the invention is preferably employed in the production of thin films of a thickness of about 2 to 12μ. However, it may also be employed in films having a thickness of from 12 to 100μ, and more. In the case of thin films it is particularly easy to adjust the extruder output. An operator is also able to adjust the width. It should be first attempted to make use of the maximum width of the extruded preliminary film and to complement the rest of the width by a modified transverse stretching ratio, in order to obtain the final width which can be produced with the machine.

However, the method according to the invention has, in addition to the desired increase in production, two other considerable advantages. One is that the operational safety of the machine is improved, because it is improbable that all the superposed film webs will break simultaneously, so that, in case one film web breaks, the others act as a support during transport. The other advantage is that the film webs stretched simultaneously and transversely also can be wound up simultaneously.

Since the thick and thin areas which are caused by the die lip are always present, and run over a length of several 10,000 m over the same parts of the film, they are all wound onto each other, if only one film is wound up. This leads to distortions and stretching which render the film useless for further treatment.

If the film webs treated according to the invention are wound onto each other, the thick and thin areas are no longer wound onto each other, because each film web has its own profile.

The method according to the invention however is not limited to the production of transversely stretched films, but preferably also may be preceded by longitudinal stretching, in which the flat film webs are parallel to and beside each other and are longitudinally stretched by means of rollers which rotate at different speeds.

It is apparent that the rollers of the device for longitudinal stretching and the cooling roller for the melt film must be adjusted to the width of the slot die used.

The stretched film webs which are superposed according to the invention also may be subjected, depending on their purpose, to a known heat-setting, which is also carried out with the film webs superposed.

After the entire treatment the film webs are usually cut to their useful width, a process which is also preferably carried out while the webs are still superposed.

After the preferred cutting process, the film webs may be separated and separately wound, if desired, or, as described before, may be wound together or directly subjected to further treatment, e.g. coating or printing.

The present invention also relates to a suitable apparatus for carrying out the method.

The simplest version thereof is composed of an extruder connected with a slot die, a cooling roller for cooling the melt and a frame for transverse stretching, for example a frame for heat-setting, as well as a device for dividing the melt into single webs and a winding device. A dividing device, preferably for dividing the melt into at least two longitudinal webs, as well as a device for superposing the different webs with edges in register, is positioned in front of the transverse stretching frame.

The extruder, the slot die and the cooling roller are, as far as their production output and their widths are concerned, constructed in such a manner that the amount of preliminary film produced is at least twice as high as the quantity usually produced for the transverse stretching frame employed.

The device for dividing the melt into at least two longitudinal webs may be basically arranged at any place in front of the transverse stretching frame and in front of the device for superposing the different webs and may be composed of corresponding knives, blades, band saws, inductively heated dividing devices, laser devices, or the like.

In practice, however, it has proved to be particularly suitable to divided the melt before it reaches the cooling drum, preferably in the die. For this, dividing wedges are preferably used.

The device for superposing the different webs preferably is composed of oblique revolving rollers over which the different webs may be guided and thus superposed with edges in register, in order to be then guided together to the transverse stretching frame.

If the film is to be stretched biaxially, it is suitable to arrange the longitudinal stretching device, which is composed or rollers rotating at different speeds, in front of the transverse stretching frame, the parallel webs which run side by side being simultaneously longitudinally stretched by rollers having the corresponding width.

If the films are to be heat-stabilized, a heat-stabilization frame is located after the transverse stretching frame.

Before the stretched and superposed films are wound up, they may be together divided into suitable useful widths and then wound together or separately onto winding cores.

Figure 2:
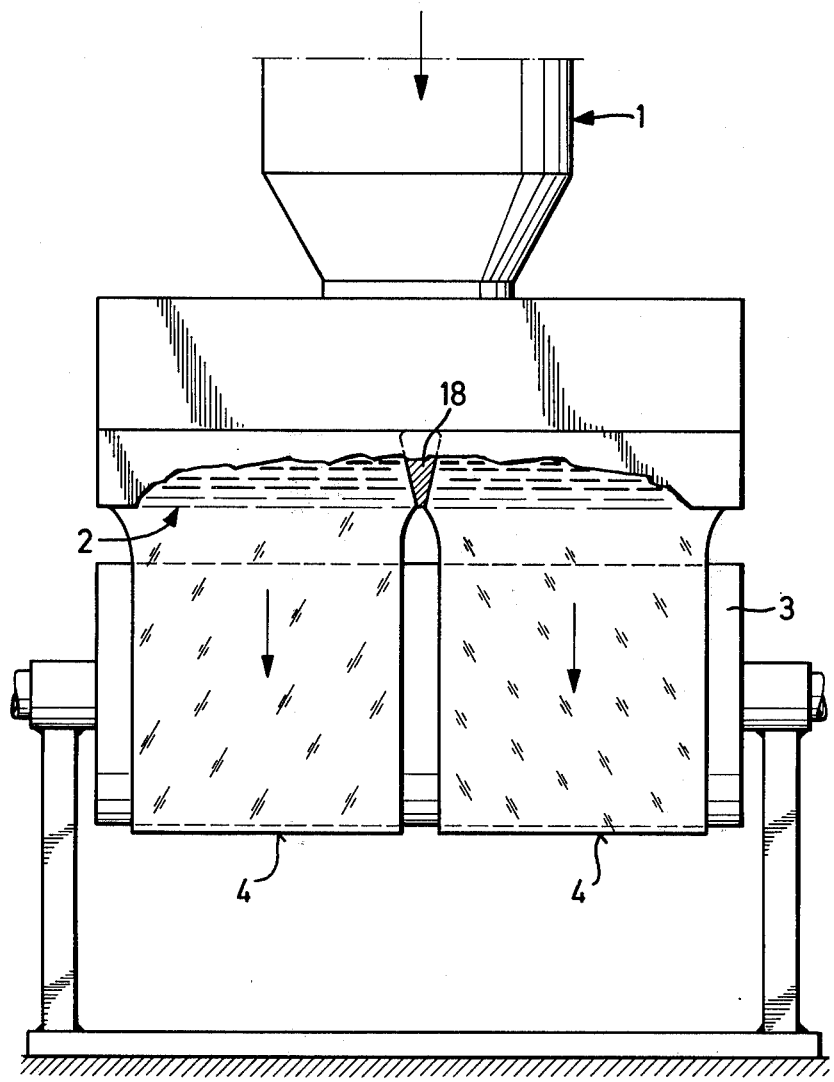
Figure 3:
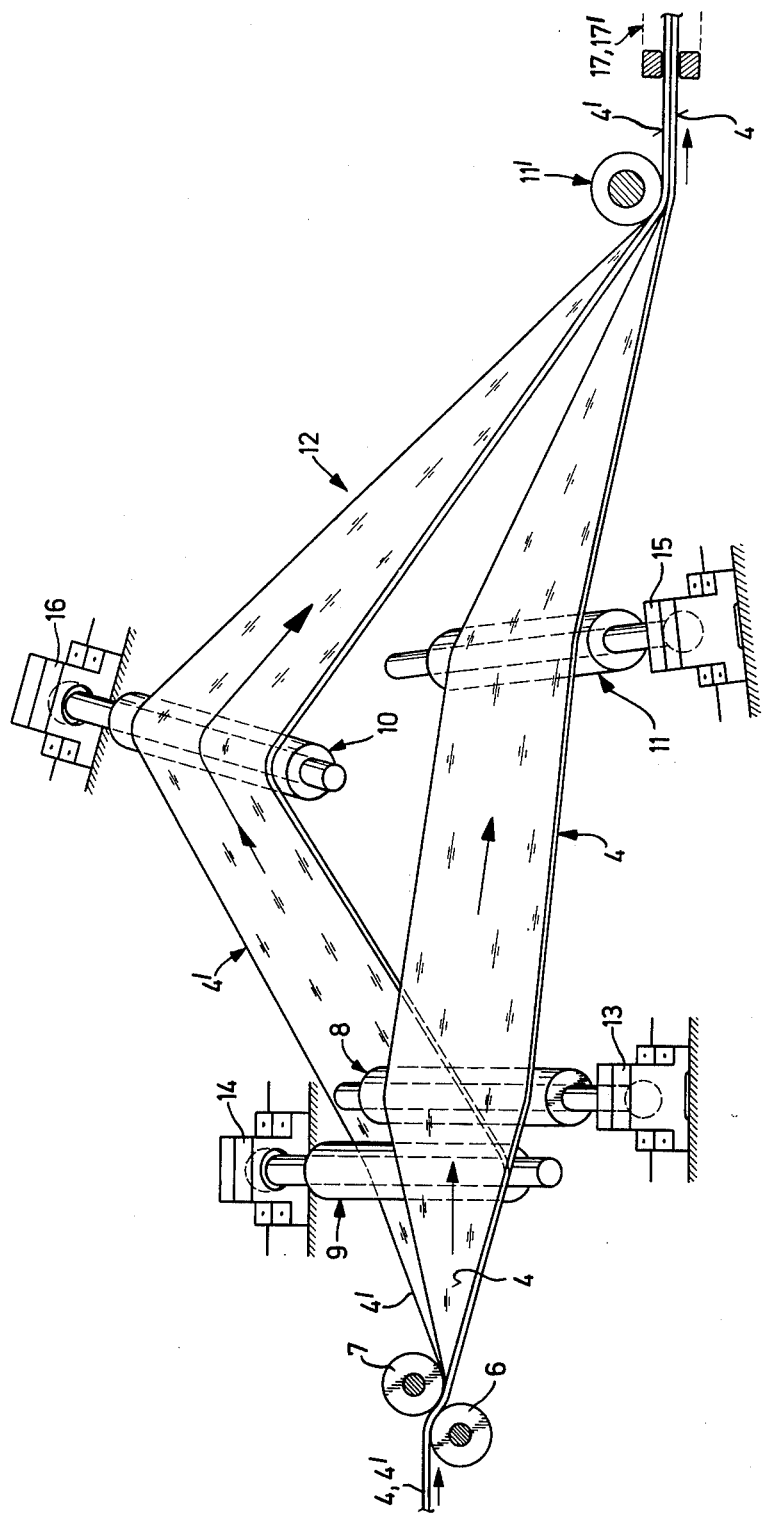

The present invention will be further illustrated by reference to the accompanying drawings, in which:

FIG. 1 is a schematic plan view of an apparatus with the slot die forming a right angle with the level of the drawing, FIG. 2 is a view and partly a section of the front of the apparatus, approximately at the level II—II of FIG. 1, FIG. 3 is a side view of the device for superposing from the level III—III of FIG. 1 and FIG. 4 is a perspective drawing of the device for superposing together with the last pair of deviating rollers of the device for longitudinal stretching.

In FIG. 1 the melt leaves the extruder 1 through the slot die 2. In the slot die there is a dividing wedge 18 (FIG. 2) which divides the melt, in this case into two melt streams 4, 4' which are solidified on the cooling roller 3 to form preliminary films. This division by means of the wedge 18 is only one possible embodiment. An alternative is, for example, to effect the division after the longitudinal stretching. The preliminary films 4, 4' run over the roller 20 into a device for longitudinal stretching which consists of three in-feed and discharge rollers 5a and 5b, respectively, and of the guide rollers 5c, 5d, 5e and 5f. The preliminary films, which run parallel and side by side, are longitudinally stretched by the rollers driven at different speeds.

The deviating rollers 6 and 7 are arranged behind the three discharge rollers and the longitudinally stretched webs partly wind round it FIG. 4). From there the webs are passed through a device 12 for superposing. The web 4 is then guided over the rollers 8 and 11, which can be adjusted in the bearings 13 and 15. The rollers 8 and 11, which can be adjusted to all directions, are adjusted in such a manner that the bend of the deviation is supported and that the two webs 4 and 4' are superposed with their edges in register, thus having a common axis (FIGS. 3 and 4). The web 4' is deviated accordingly over the rollers 9 and 10 which are supported by the bearings 14 and 16. The bends of the webs 4 and 4' are arched downwardly and upwardly, respectively. The superposed webs with their edges in register are guided over a collecting roller 11' and at the same time gripped by the clips 17, 17' of the transverse stretching frame which is provided with a heating chamber 19. This roller 11' is adjusted exactly parallel to the frame and the rest of the apparatus in order to neutralize all the angles and to make possible the exact seizure of the double web by the clips. A complete description of the transverse stretching frame is not included, because this is a known device.

FIG. 2 shows the slot die 2 provided with the dividing wedge 18 which divides the melt, before it reaches the cooling roller 3, into the two melt webs 4 and 4'.

Apart from the deviation described, other deviations also are possible. For example, roller pairs which are arranged on top of each other or side by side may be used at the points of deviation. One web winds around the rollers in the form of an 'S' each time.

Whereas the first pair creates the deviation angle of the web by means of a certain oblique position with the axes of the rollers forming the angle bisector of the deviation angle, the webs are again caused to run parallel to each other by means of the opposite adjustment of the second pair of rollers, after the desired distance between the webs has been reached.

As an alternative to the use of a slot die having the corresponding width, a method and an apparatus may be used in which at least two slots dies are arranged side by side and the corresponding number of melt streams is extruded. The essential point remains the basic concept of the invention to produce the webs side by side and guide them in this position, stretch them longitudinally, if desired, superpose them before they are transversely stretched, and in this condition pass them on to the clips.

It will be obvious to those skilled in the art that many modifications may be made within the scope of the present invention without departing from the spirit thereof, and the invention includes all such modifications.

What is claimed is:

1. In an improved method for increasing the production of stretched flat film webs of thermoplastic material in which a melt of thermoplastic material is extruded from a slot die, the melt is solidified to form a film, the film is transversely stretched, the stretched film is heat-set, the heat-set film is divided into narrower webs, and wound up, the improvement comprising extruding the melt from a slot die wider than the die normally employed for the production of a preliminary film, which usually corresponds to the width of a transverse stretching frame, using an extruder having an output corresponding to the width of said wider die, dividing the melt in the longitudinal direction into at least two films, superposing the film webs so that they are in register and non-laminated, transversely stretching said superposed non-laminated films, heat-setting the superposed films, separating the stretched and heat-set films into individual layers, and winding them up.

2. A method according to claim 1 in which said melt is divided within the die.

3. A method according to claim 1 in which, after solidifying the melt, the films are longitudinally stretched side by side.

* * * * *